US011169605B2

United States Patent
Chu et al.

(10) Patent No.: US 11,169,605 B2
(45) Date of Patent: Nov. 9, 2021

(54) OPERATING METHOD FOR WEARABLE DEVICE INTERACTING WITH OPERATED DEVICE IN VIRTUAL REALITY AND OPERATING DEVICE THEREOF

(71) Applicant: J-MEX Inc., Hsinchu (TW)

(72) Inventors: Chin-Ting Chu, Hsinchu (TW);
Chia-Wei Lee, Hsinchu (TW);
Chih-Hung Hsu, Hsinchu (TW);
Te-Hsi Chen, Hsinchu (TW);
Chi-Hung Chen, Hsinchu (TW);
Meng-Yu Lee, Hsinchu (TW)

(73) Assignee: J-MEX INC., Hsinchu (TW)

( * ) Notice: Subject to any disclaimer, the term of this patent is extended or adjusted under 35 U.S.C. 154(b) by 0 days.

(21) Appl. No.: 16/732,934

(22) Filed: Jan. 2, 2020

(65) Prior Publication Data

US 2020/0218349 A1 Jul. 9, 2020

(30) Foreign Application Priority Data

Jan. 3, 2019 (TW) ................. 108100238

(51) Int. Cl.
*G06F 3/01* (2006.01)
*G06F 1/16* (2006.01)

(52) U.S. Cl.
CPC .............. *G06F 3/014* (2013.01); *G06F 1/163* (2013.01); *G06F 3/017* (2013.01)

(58) Field of Classification Search
None
See application file for complete search history.

(56) References Cited

U.S. PATENT DOCUMENTS

| 2016/0098095 A1* | 4/2016 | Gonzalez-Banos ..... A63F 13/92 345/156 |
|---|---|---|
| 2016/0306422 A1 | 10/2016 | Parham |
| 2017/0109936 A1 | 4/2017 | Powderly |
| 2018/0053350 A1 | 2/2018 | Riscombe-Burton |
| 2018/0095542 A1 | 4/2018 | Mallinson |

OTHER PUBLICATIONS

Chen et al.;"The research of using data glove in virtual assembly environment;" Second International Conference on Image and Graphics, 2002, Hefei, China; Jul. 2002; Proc. SPIE vol. 4875 (2002); pp. 1112-1116 (Year: 2002).*

* cited by examiner

*Primary Examiner* — Edward Martello
(74) *Attorney, Agent, or Firm* — Volpe Koenig

(57) ABSTRACT

An operating method in a virtual environment through a wearable device is disclosed, wherein the wearable device has a motion sensor, the virtual environment has an operated object and a virtual device corresponding to the wearable device, the corresponding virtual device has a first operational data constraint, and the operated object has a second operational data constraint. The operating method comprises the following steps of: using the motion sensor to generate a motion sensed data; causing the corresponding virtual device to generate a derived data according to the motion sensed data, wherein the derived data indicates an interaction relationship between the virtual device and the operated object; and when the virtual device separated from the operated object under the interaction relationship, moving the operated object in accordance with the derived data.

18 Claims, 14 Drawing Sheets

OPERATING METHOD FOR WEARABLE DEVICE INTERACTING WITH OPERATED DEVICE IN VIRTUAL REALITY AND OPERATING DEVICE THEREOF

TECHNICAL FIELD

This application claims the benefit of Taiwan's Patent Application No. 108100238, filed on Jan. 3, 2019, at Taiwan's Intellectual Property Office, the disclosures of which are incorporated herein in their entirety by reference.

Embodiments of the present disclosure are related to an operating method of interacting with a virtual reality, and more particularly to an operating method of interacting with a virtual reality for depending on a wearable device and an operating device thereof.

BACKGROUND

Virtual reality can be applied to simulate various real-world conditions, rehearse possible situations in advance, and also present various realities in real time. For example, by using specific flight simulation software, it can create the flight conditions of a real civil aircraft for training pilots. In that way, the pilot can practice different scenarios using virtual reality without having to be in an actual airplane each time. For example, in an emergency or dangerous situation, the pilot will be able to calmly deal with the emergency due to the virtual reality training done beforehand. For another example, the virtual reality helmet can be used to simulate the sky walk on the steel cable, to avoid the walker from an accidentally falls happened in real world.

With the existing virtual reality devices or equipment, the way to interact with the virtual environment is mostly to control the virtual object in the 3D virtual reality by the interface device. In order to simulate the posture or the motion state in the real world, the position and motion state of the physical object in space are detected by an optical detection means or a wireless electrical detection means to map the position of the virtual object in the virtual reality space. For example, in the patent documents of the prior art, US20170109936 A1, US20160306422 A1, US20180053350 A1, US20170192494 A1, US20180095542 A1, etc., interaction with a virtual reality by a wearable device in the real world is disclosed.

However, the present invention uses motion sensors such as accelerometer, gyro and e-compass to detect a motion of a device in the real world to simulate the motion state of virtual objects in the virtual world. It further includes making the virtual object have the characteristics of the motion detected by the motion sensors so as to enable the virtual objects in the virtual world to perform a motion corresponding to the device's motion in the real world.

SUMMARY OF INVENTION

In contrast to the above-mentioned prior arts, the present invention proposes a smart glove, which is convenient to realize a real hand movement in a virtual reality. By using the smart glove worn on one hand to sense a movement of the hand, a motion sensing signal is generated to facilitate a hand model in a virtual reality to perform a synchronized motion or a corresponding motion with the hand.

By the connection interface coupling to a virtual reality generating device, for example, wireless or wired USB COM Port, the connection interface can connect to a smart glove having one or a plurality of motion sensor(s), and one or a plurality of motion sensing data sensed by each motion sensor can generate one or a plurality of derived datum/data via an algorithm. For example, one or a plurality of quaternion(s) and Euler angle(s) is/are realized by software having a specific function, or hardware. Thus, the derived datum/data generated by using the algorithm can change the posture of the hand model, and achieve the motion efficacies of three motion degrees of freedom (3-DoF). In addition, by combining with a specific motion device that can provide a spatial positioning function, it can make the space positioning and tracking functions, and achieve the efficacies of six motion degrees of freedom (6-DoF).

6-DoF indicates translations and rotations of an object. Applying the smart glove having 6-DoF to the hand to drive the hand model in virtual reality to synchronize in motion with the hand in the real world, the user can transfer the motion states of the hand wearing the smart glove in the real world to the virtual reality. A realistic state of motion includes the rotations of the wrist and the movements of the fingers and the hand. The application device disclosed in the present invention is a smart glove that can capture the movements of the real hand to drive the hand model interacting with an object in the virtual reality.

By using the hand model in the virtual reality, it can carry out the two actions that the hands often do, such as grasping or throwing. By using a collision detection function provided by the adopted software, or hardware to determine whether the hand model constructed in the virtual environment touches an (interactive) virtual object, and discriminates the action of the current hand model according to a touch situation (including collision and contact). If the determined action is a holding or a grasping, that is, a relatively holding operation performed by the fingers or a grasping action performed by the fingers and the palm, and the virtual object will move along with the hand model. If the determined action is throwing, that is, a relative release action performed by the holding fingers or by the holding fingers and palm, the virtual object obtains a velocity vector and an angular velocity vector of the hand model when the release action occurs, and by using a software having a specific function, or a physical engine of the hardware, it can simulate a motion state of the virtual object having the velocity vector or the angular velocity vector under a physical quantity.

By using the wearable device, the motion of the hand in the real world can be delivered or mapped to a specific operated member defined in the virtual environment. Alternatively, the specific operated member can show the hand motion in the real world, so that the specific operated member can interact with an operated object in the virtual reality. For example, the motion sense data detected by the motion sensor in the smart glove can be calculated by an algorithm to generate a derived data, such as a quaternion data, to meet the requirements of a first specific function of an adopted software or hardware, and to meet the requirements of a second specific device, such as a second specific function condition of a motion device that can provide a space positioning function.

In accordance with one embodiment of the present disclosure, an operating device 10 for operating a virtual object is provided. The operating device for operating the virtual object comprises a wearable device and a processing module. The wearable device is worn on a limb and has a motion sensor sensing a motion of the limb to generate a sensed data associated with the motion. The processing module is coupled to the wearable device, and operates the sensing data to generate a derived data, wherein the processing module generates a virtual environment, and determines whether the derived data satisfies a first operational data constraint and a second operational data constraint. The virtual environment is configured to construct a mapped object and a virtual object, wherein the mapped object virtually simulates the motion according to the derived data, and the virtual object interacts with the mapped object when the first and the second operational data constraints are satisfied.

In accordance with another embodiment of the present disclosure, an operating method for a wearable device interacting with an operated object in a virtual reality is provided. Wherein the wearable device has a motion sensor, corresponds to a mapped object in the virtual reality, and is coupled to a first specific unit for executing a first specific function and a second specific unit for executing a second specific function, the method comprises steps of: providing an algorithm; generating a motion sensing data by using the motion sensor; generating a derived data based on the motion sensing data by using the algorithm; ascertaining whether the derived data meets a first operational data constraint of the first specific function and a second operational data constraint of the second specific function so as to make a determined result; and when the wearable device delivers an action in a real world and the determined result is positive, the mapped object simulates the action in the real world to interact with the operated object.

In accordance with a further embodiment of the present disclosure, an operating device for operating a virtual object is provided. The operating device for operating a virtual object comprises a wearable device and a processing module. The wearable device is worn on a limb, and has a motion sensor sensing a motion of the limb to generate a sensed data associated with the motion. The processing module is coupled to the wearable device, and operates the sensing data to generate a derived data, wherein: the processing module generates a virtual environment, and determines whether the derived data satisfies a first operational data constraint and a second operational data constraint; and the virtual environment is configured to construct a mapped object and a virtual object, wherein the mapped object virtually simulates the motion according to the derived data, the virtual object interacts with the mapped object when the first and the second operational data constraints are satisfied.

In accordance with a further embodiment of the present disclosure, an operating method in a virtual environment through a wearable device is provided, wherein the wearable device has a motion sensor, the virtual environment has an operated object and a virtual device corresponding to the wearable device, the corresponding virtual device has a first operational data constraint, and the operated object has a second operational data constraint, the operating method comprises the following steps of: using the motion sensor to generate a motion sensed data; causing the corresponding virtual device to generate a derived data according to the motion sensed data, wherein the derived data indicates an interaction relationship between the virtual device and the operated object; and when the virtual device is separated from the operated object under the interaction relationship, moving the operated object in accordance with the derived data.

The above embodiments and advantages of the present invention will become more readily apparent to those ordinarily skilled in the art after reviewing the following detailed descriptions and accompanying drawings:

DETAILED DESCRIPTION OF THE PREFERRED EMBODIMENTS

Please refer to all Figs. accompanied with the detailed description of the present invention, theses FIGS. showing different embodiments to facilitate the skilled person in the art to understand the features of the present invention. The disclosure provides sufficient embodiments to demonstrate the features of the present invention, each disclosed embodiment does not conflict with the others, and new embodiments can be implemented through an arbitrary combination thereof, i.e., the present invention is not restricted to the embodiments disclosed in the present specification.

Figure 1:
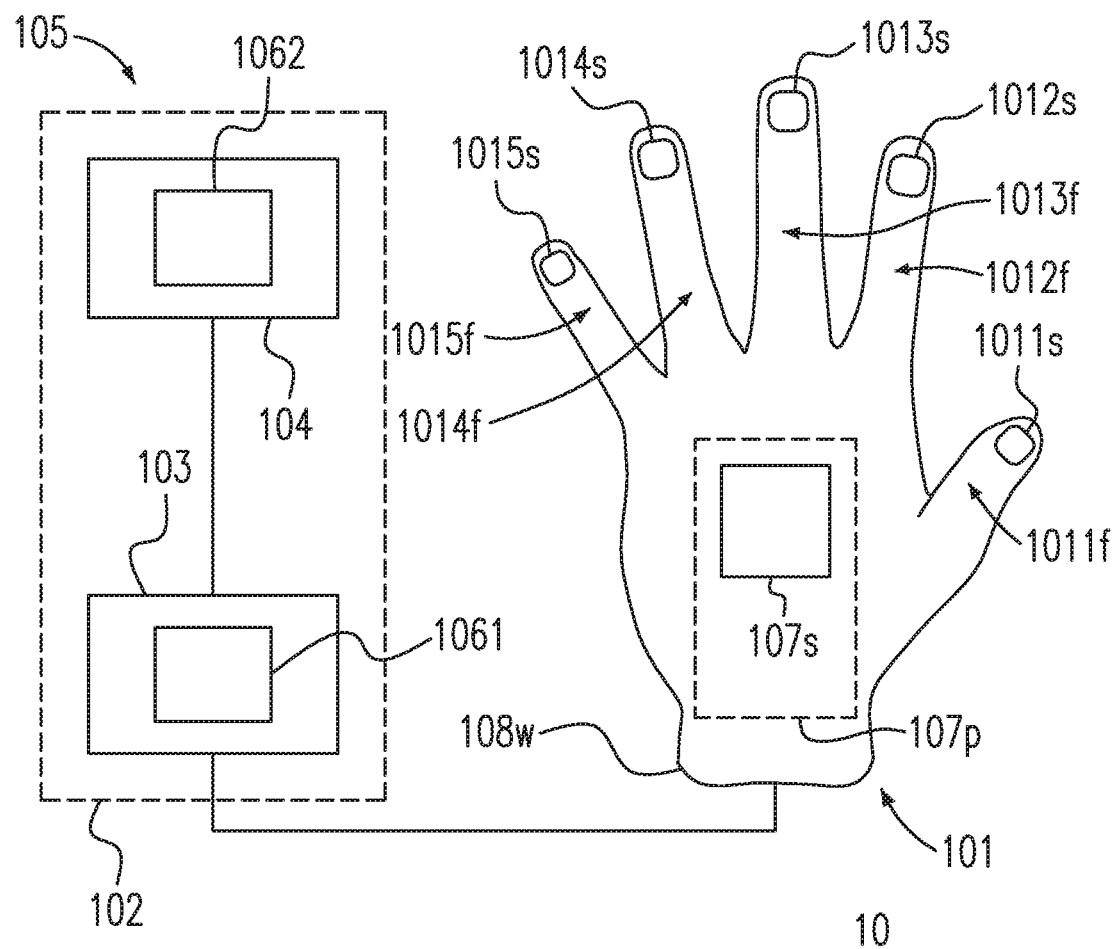
FIG. 1 shows a schematic diagram of an operating device for operating a virtual object according to a preferred embodiment of the present disclosure.

Please refer to FIG. 1, which shows a schematic diagram of an operating device 10 for operating a virtual object according to a preferred embodiment of the present disclosure. Please refer to FIG. 2, which shows a schematic diagram of data, algorithms and determining conditions according to FIG. 1 in a preferred embodiment of the present disclosure. Please refer to FIG. 3, which shows a schematic diagram of the mapped object VOB1 and the virtual object VOB2 in the virtual environment VENV1 according to a preferred embodiment of the present disclosure. Please refer to FIGS. 1, 2 and 3 for the following descriptions. The operating device 10 for operating a virtual object VOB2 comprises a wearable device 101 and a processing module 102. The wearable device 101 is worn on a limb 1011*f*, 1012*f*, 1013*f*, 1014*f*, 1015*f* and 107*p*, and has a motion sensor 1011*s*, 1012*s*, 1013*s*, 1014*s*, 1015*s* and 107*s* sensing a motion of the limb 1011*f*, 1012*f*, 1013*f*, 1014*f*, 1015*f* and 107*p* to generate a sensed data SDA1 associated with the motion. The processing module 102 is coupled to the wearable device 101, and operates the sensing data SDA1 to generate a derived data DRV_DA1, wherein the processing module 102 generates a virtual environment VENV1, and determines whether the derived data DRV_DA1 satisfies a first operational data constraint COND1 and a second operational data constraint COND2. The virtual environment VENV1 is configured to construct a mapped object VOB1 and a virtual object VOB2, wherein the mapped object VOB1 virtually simulates the motion according to the derived data DRV_DA1, and the virtual object VOB2 interacts with the mapped object VOB1 when the first and the second operational data constraints COND1, COND2 are satisfied.

Figure 3:
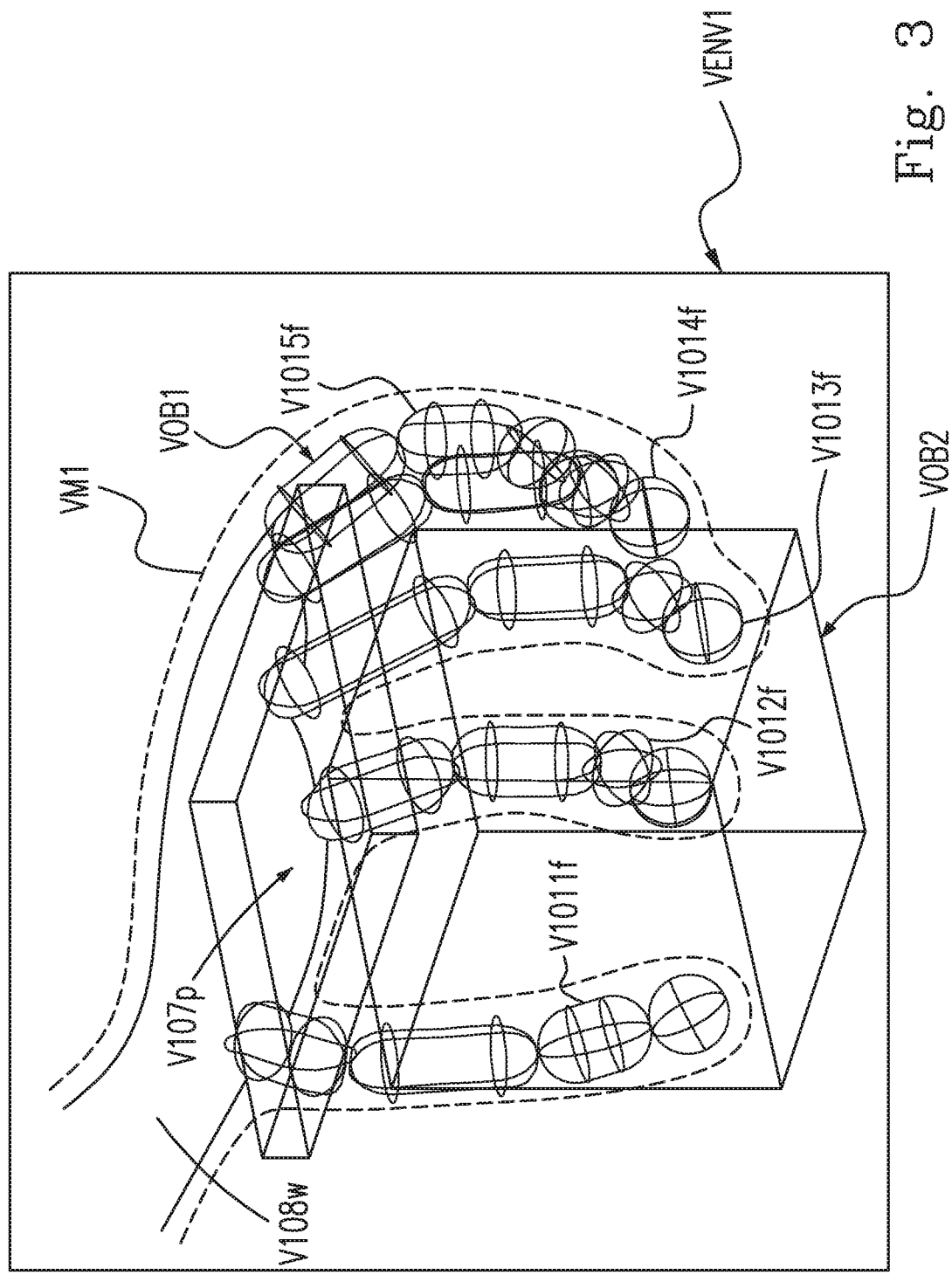
FIG. 3 shows a schematic diagram of the mapped object and the virtual object in the virtual environment according to a preferred embodiment of the present disclosure.

In FIG. 1, the processing module 102 is a condition determination unit 105. The condition determination unit 105 includes at least one of a touch detection unit 103, a virtual environment generation unit 104, and associated operation software 1061 and 1062. The wearable device 101 can include a smart glove, and the limbs 1011*f*, 1012*f*, 1013*f*, 1014*f*, 1015*f* and 107*p* include at least one of a palm 107*p* and a plurality of fingers 1011*f*, 1012*f*, 1013*f*, 1014*f* and 1015*f*. The motion sensors 1011*s*, 1012*s*, 1013*s*, 1014*s*, 1015*s* and 107*s* include at least one of an accelerometer, a gyroscope, and a geomagnetic instrument. The derive data DRV_DA1 includes at least one of a quaternion data and an Euler angle data. The first operational data constraint COND1 is a touch data constraint set by the touch detection unit 103, the second operational data constraint COND2 is a spatial position data constraint set by the virtual environment generation unit 104 and its operation software 1061 and 1062. In FIG. 3, the mapped object VOB1 is a first virtual object or a virtual hand model, and includes at least one of a virtual palm V107*p*, a virtual wrist V108*w*, a virtual thumb V1011*f*, a virtual index finger V1012*f*, a virtual middle finger V1013*f*, a virtual ring finger V1014*f* and a virtual little finger V1015*f*. The virtual object VOB2 is a second virtual object of which a motion state is controlled by the mapped object VOB1. In another preferred embodiment, the mapped VOB1 can also show a virtual motion corresponding to the motion state related to the sensing data SDA1. In addition, the virtual object VOB2 will interact with the virtual motion of the mapped VOB1, if the first operational data constraint COND1 and the second operational data constraint COND2 are satisfied.

In FIG. 1, the virtual environment generation unit 104 is configured to establish a virtual environment VENV1, which is a virtual reality device with spatial positioning and motion tracking functions. The virtual environment generation unit 104 has a built-in controller, which can be used to capture the position of the wearable device 101 in real space. Please refer to FIG. 3, the touch detection unit 103 can be a software or hardware component, and can simulate the wearable device 101 and the virtual object VOB2 to interact with each other. By the results of the calculation of the algorithm AG1, the real motions of the hand limbs 1011*f*, 1012*f*, 1013*f*, 1014*f*, 1015*f* and 107*p*, a variety of hand gestures such as rock-paper-scissors, or hand motions such as wave, bend, and flip motions, etc., can be simulated.

Figure 2:
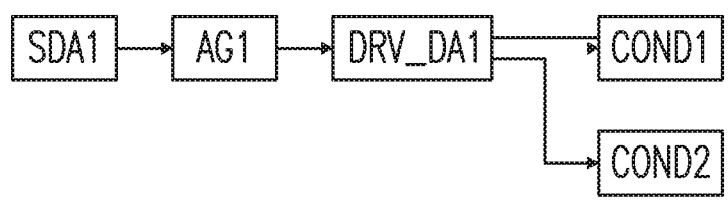
FIG. 2 shows a schematic diagram of data, algorithms and determining conditions according to FIG. 1 in a preferred embodiment of the present disclosure.

Please refer to FIGS. 1, 2 and 3, regarding the interactive function setting of the virtual environment VENV1, the mapped object VOB1 is, for example, a virtual hand model VM1, and the parameter settings of the interaction scenario with the virtual object VOB2 can be classified into rigid body settings and collision settings. In the environment in which the touch detection unit 103 operates, the virtual hand model that can be operated in the virtual environment VENV1 is created corresponding to the wearable device 101. In addition, under the operation of the touch detection unit 103 the virtual hand model is simulated to interact with the touch detection unit 103 according to a Rigid body condition and a Collision condition settings thereof, and thereby defining a determining condition for determining whether the virtual hand model VM1 in the virtual environment VENV1 and the virtual object VOB2 has an interactive operation, such as a collision operation.

Figure 4:
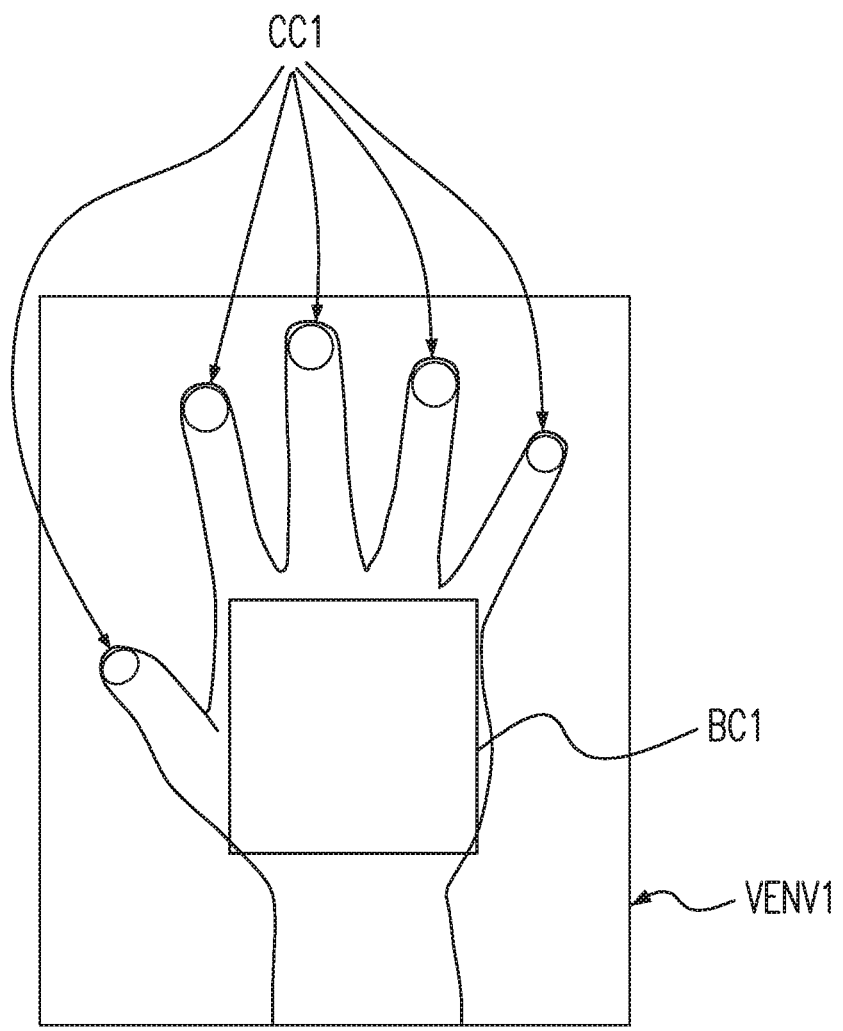
FIG. 4 shows a schematic diagram of the virtual hand model according to a preferred embodiment of the present disclosure.

The operation of the interaction between the mapped object VOB1 also the virtual hand model VM1 and the virtual object VOB2 is, when the rigid body condition is set to true, the reaction force effect is disabled; if not set to true, the reaction force effect is enabled, thus in the case of the virtual hand model VM1 collides with the virtual object VOB2, such as a wall, the virtual hand model VM1 will rebound. The virtual hand model VM1 includes two types of colliders, namely, a box collider BC1 and a capsule collider CC1. As shown in FIG. 4, it is a schematic diagram of the virtual hand model VM1 according to a preferred embodiment of the present disclosure. Please refer to FIGS. 3 and 4, the virtual palm portion V107*p* uses the box type collider BC1, and the boundary of the virtual palm V107*p* in the virtual hand model VM1 is set according to the size of the actual hand 1011*f*, 1012*f*, 1013*f*, 1014*f*, 1015*f* and 107*p* of the wearable device 101, such as the smart glove. In addition, the virtual finger portions V1011*f*, V1012*f*, V1013*f*, V1014*f* and V1015*f* in the virtual hand model VM1 are simulated by using the capsule collider CC1 of the collision detecting unit 103. By using the two coordinates distance formula, the length between the joint points can be calculated, the two coordinates midpoint formula is used to obtain the center point between different joint points, and the center point and length of each collider corresponding to each virtual finger V1011*f*, V1012*f*, V1013*f*, V1014*f* and V1015*f* are set according to the calculation results.

In FIG. 1, the wearable device 101 can sense the three degrees of freedom of rotation motion (3-DoF Rotation Motion) of each of the fingers 1011*f*, 1012*f*, 1013*f*, 1014*f* and 1015*f* and the wrists 108*w* of the hand. According to the motion sensing data SDA1, the virtual hand model VM1 is shown through the touch detection unit 103. Combined with the spatial positioning tracking function of 3-DoF of translation motion provided by the virtual environment generation unit 104, the virtual hand model VM1 can freely move in six degrees of freedom of motion (6-DoF) when it is realized in the virtual reality VENV1. After wearing the wearable device, the hand 1011f, 1012f, 1013f, 1014f and 1015f in the space can instantly interact with the virtual object VOB2 in the virtual reality VENV1 by the virtual hand model VM1. The manner of interaction in the virtual reality VENV1 is not much different from that of reality, and includes grasping the object by hand or throwing out the object by hand, etc. The physics engine of the touch detection unit 103 is utilized in the operating device 10 of the present invention to realize the interaction between the virtual hand model VM1 and the virtual object VOB2. The touch detection unit 103 is scheduled to perform a simulation and a collision determining every 20 ins. In a preferred embodiment, the operating device 10 of the present invention determines whether an interactive motion is happened between the virtual hand model VM1 and the virtual object VOB2, that is if a predetermined collision condition is met, then to determine whether the virtual hand model VM1 is grasping or releasing the virtual object VOB2.

Figure 5:
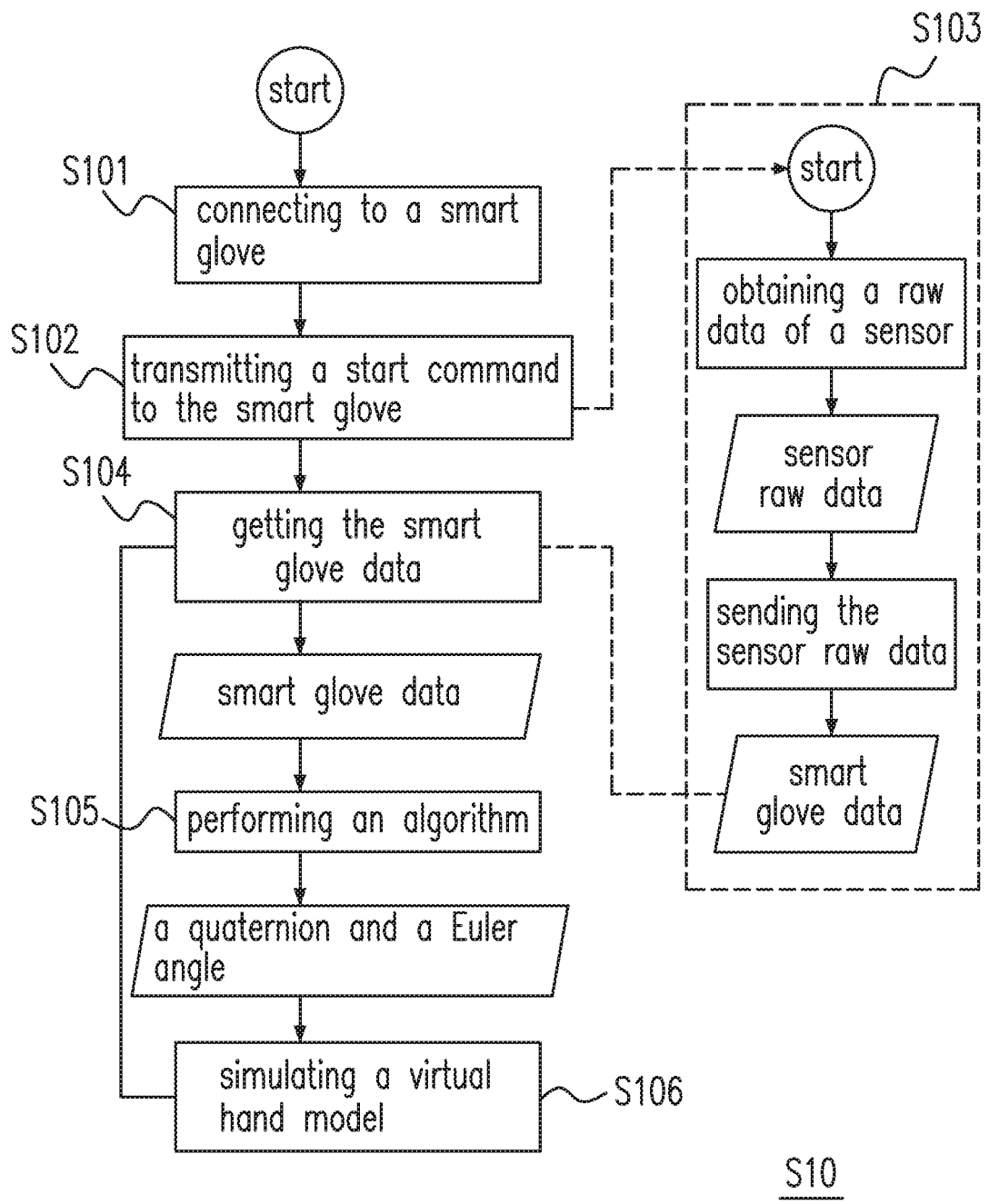
FIG. 5 shows a schematic diagram of an operation flow of the operating device according to a preferred embodiment of the present invention.

Please refer to FIG. 5, which shows a schematic diagram of an operation flow S10 of the operating device 10 according to a preferred embodiment of the present invention. The operation flow S10 includes: Step S101, connecting a smart glove through a wireless network or a wired USB COM Port; Step S102, after the connection is completed, transmitting a start command to the smart glove; and Step S103, the smart glove receives the start command and starts to gather and transmit data of the sensor (including the acceleration sensor, the gyroscope and the geomagnetic instrument); and further includes sub-steps of: obtaining a raw data of a sensor; and sending the sensor data, also a smart glove data. Step S104, receiving the data of the sensor; Step S105, utilizing an algorithm to process the sensor data to obtain a derived data, i.e. a quaternion and an Euler angle; Step S106, applying the derived data to transfer the motion of the real hand wearing the smart glove into the motion of the virtual hand model. The flow chart of the motion determination is shown in the sub-steps of FIG. 6.

Figure 6:
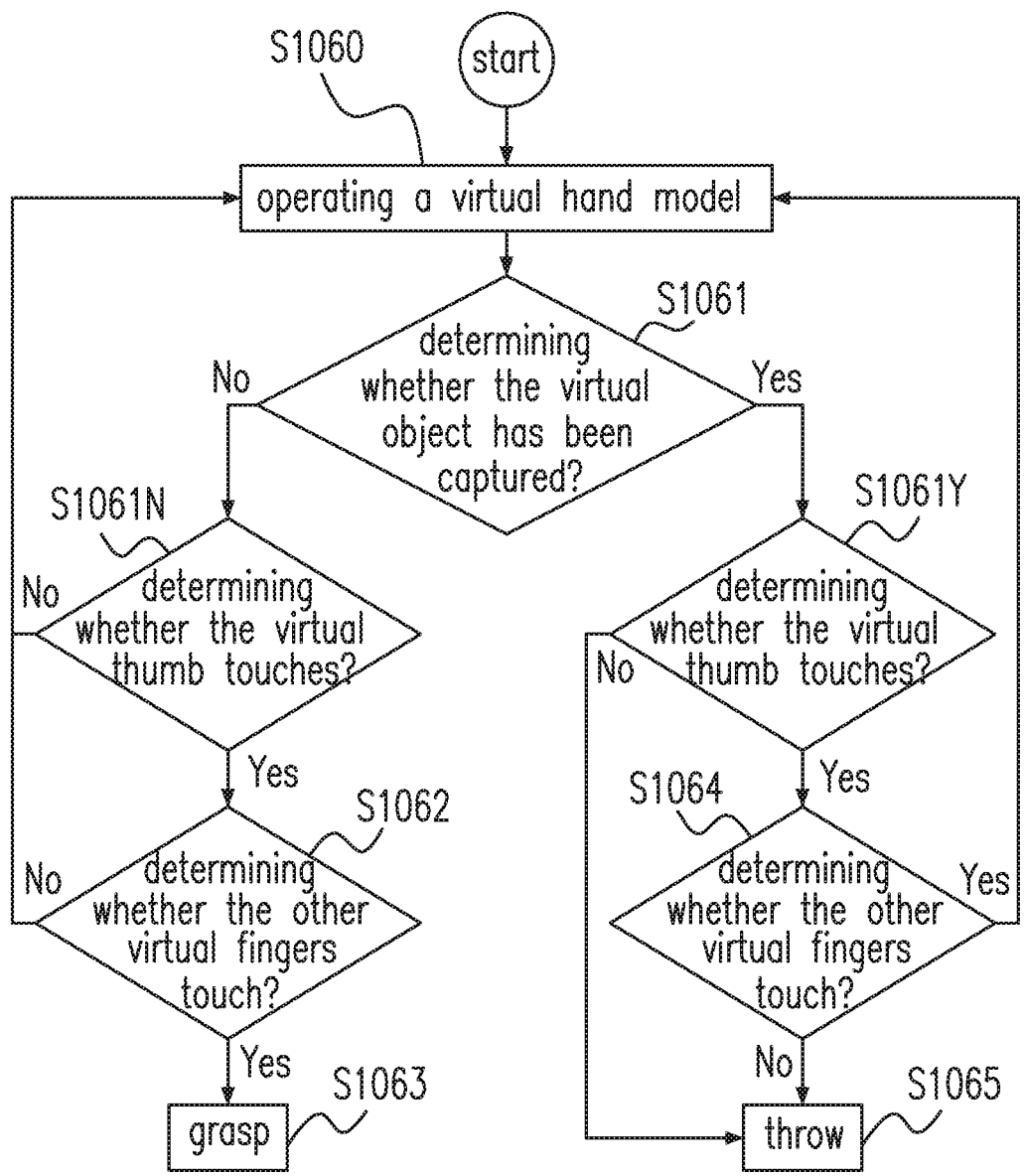
FIG. 6 shows a schematic diagram of the motion determining of the virtual hand model according to the preferred embodiment of the present invention.

Please refer to FIG. 6, which shows a schematic diagram of the motion determination of the virtual hand model VM1 according to the preferred embodiment of the present invention. Please refer to FIGS. 3 and 6, step S1060 shows how to operate a virtual hand model. Firstly, the process proceeds to step S1061, determining whether the virtual object VOB2 has been captured. If not, the process proceeds to step S1061N, determining whether the virtual thumb V1011f touches the virtual objects VOB2. If not, the process returns to the starting point S1060 to resume. If yes, the process proceeds to step S1062, determining whether the other virtual fingers V1012f, V1013f, V1014f and V1015f touch the same virtual object VOB2 as the virtual thumb V1011f touches. If no, then the process returns to the starting point S1060 to resume. If yes, the process proceeds to step S1063 changing the operation state of the virtual object VOB2 into the captured state.

Accordingly, in step S1061, if the virtual object VOB2 has been captured in the beginning, then the process proceeds to step S1061Y. Similarly, determining whether the thumb V1011f continues to touch the captured virtual object VOB2. If not, then the process proceeds to step S1065, the virtual object VOB2 is released, meaning that the operation state of the VOB2 or the VM1 is changed from the grasp state into a release state, and the corresponding motion state of the VOB2 is performed according to the present speed vector of the virtual hand model VM1. If yes, the process proceeds to step S1064, determining whether there are other virtual fingers V1012f, V1013f, V1014f and V1015f continuously touch the captured virtual object VOB2. If yes, then the process returns to the starting point S1060 to resume. If not, then the process proceeds to step S1065, and the virtual object VOB2 is released, meaning that the operation state of the VOB2 or the VM1 is changed from the grasp state into the release state, and performs the corresponding motion state—according to the current velocity vector of the virtual hand model VM1 when the virtual object VOB2 is released.

The collision detection is performed by the condition determination unit 105, and the collision condition needs settings of the object material and the related collision detection conditions for the moving party. For example, the object material setting is such as the rigid body and a collider. In the preferred embodiment of the present invention, the first virtual object is controlled by the wearable device 101, that is, the virtual hand model VM1. The second virtual object in the virtual reality VENV1 is the virtual object VOB2. The determining method for collision between these two virtual objects is as follows. Because the first and the second virtual objects have respectively set a first party collision condition (Collider) and a second party collision condition, it indicates a collision occurred when these two virtual objects overlap partially each other. For example, the condition determination unit 105 determines the first operational data constraint COND1 by judging whether the derived data DRV_DA1 associated with a virtual touch position of the wearable device 101 meets a space position data constraint of a specific range occupied by the virtual object VOB2 in the virtual reality VENV1. When the collision occurs between the virtual hand model VM1 and the virtual object VOB2, it will trigger the determination functions, such as OnCollisionEnter, OnCollisionStay and OnCollisionExit, which are used to judge the first event the collision occurs, the second event the collision continues and the third event the collision ends, respectively. In a preferred embodiment, using OnCollisionEnter and OnCollisionExit functions can determine whether some fingers of the virtual hand model VM1 collide with the virtual object VOB2. In an embodiment of determining the collision state, when the collided second virtual object VOB2 is determined being touched by at least two virtual fingers of the first virtual object VOB1 (i.e., the virtual hand model VM1), at least one finger thereof is the thumb V1011, the second virtual object is in a captured state, as shown in FIG. 3.

Similarly, the second operational data constraint condition COND2 is determined by judging whether the derived data DRV_DA1 related to the virtual touch position of the wearable device 101 meets the space position data constraint of the specific range occupied by the operated object VOB2 in the virtual reality VENV1, and whether a second touch data constraint with no finger touches or with only one finger touches is met, and thereby completing the second determining operation, wherein the derived data includes at least one of an acceleration data, an angular velocity data, and a position data of the motion sensor.

Figure 7:
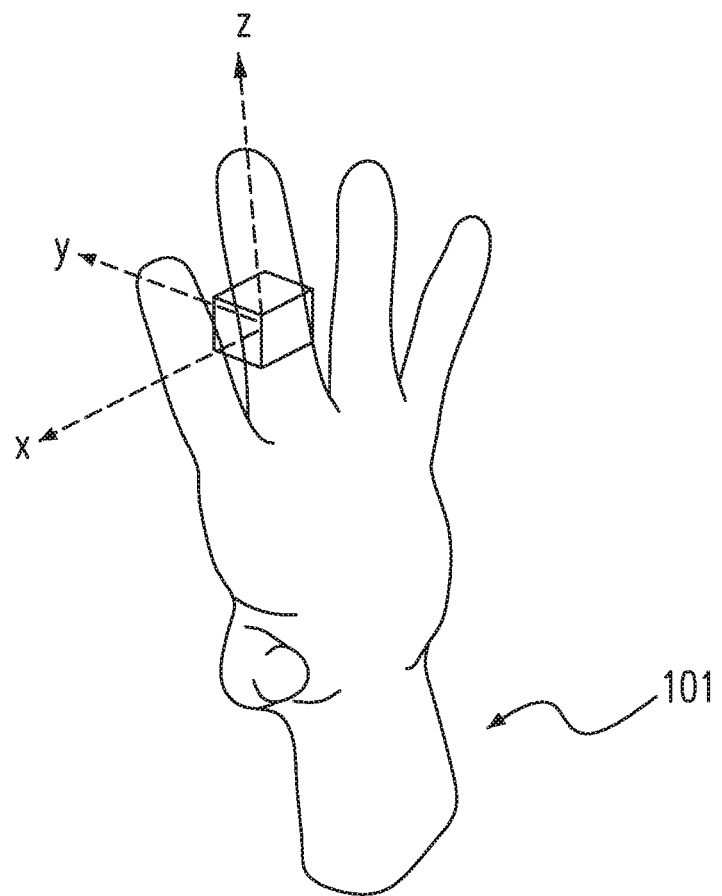
FIG. 7 shows a schematic diagram of the motion coordinate setting of the wearing device according to a preferred embodiment of the present invention.

Please refer to FIG. 7, which shows a 3-axis coordinate for describing the motions of the wearing device 101 according to a preferred embodiment of the present invention. The operation of the operating device 10 constructed to operate the angle movements of each fingers and thumb wearing the wearing device 101 to capture the virtual object VOB2 in the virtual reality VENV1, or to release the virtual object VOB2 is shown in FIG. 8A and 8B.

Figure 8A:
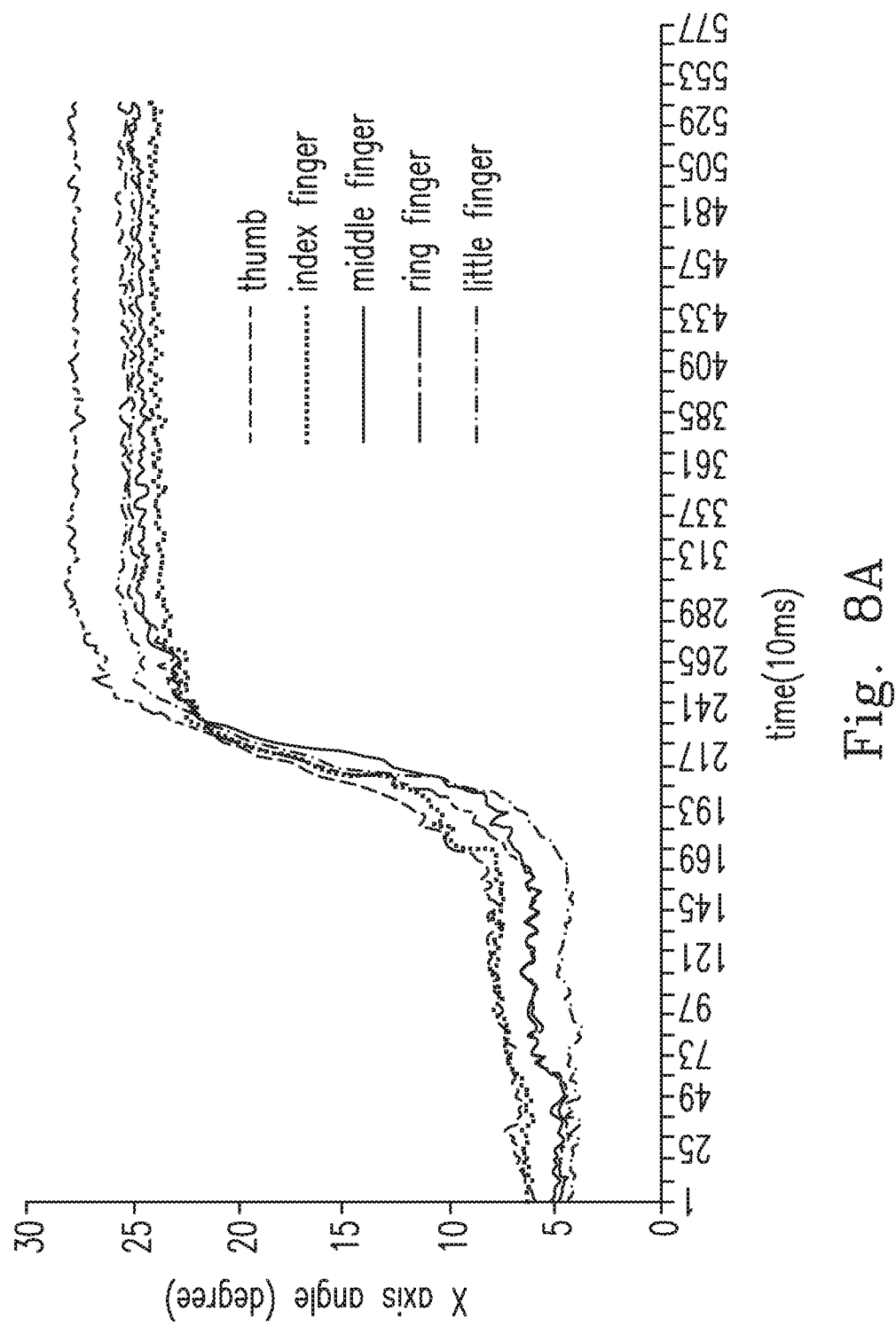
FIG. 8A shows a schematic diagram of the operation angles related to X-direction of each fingers in capturing a virtual object according to a preferred embodiment of the present invention.
Figure 8B:
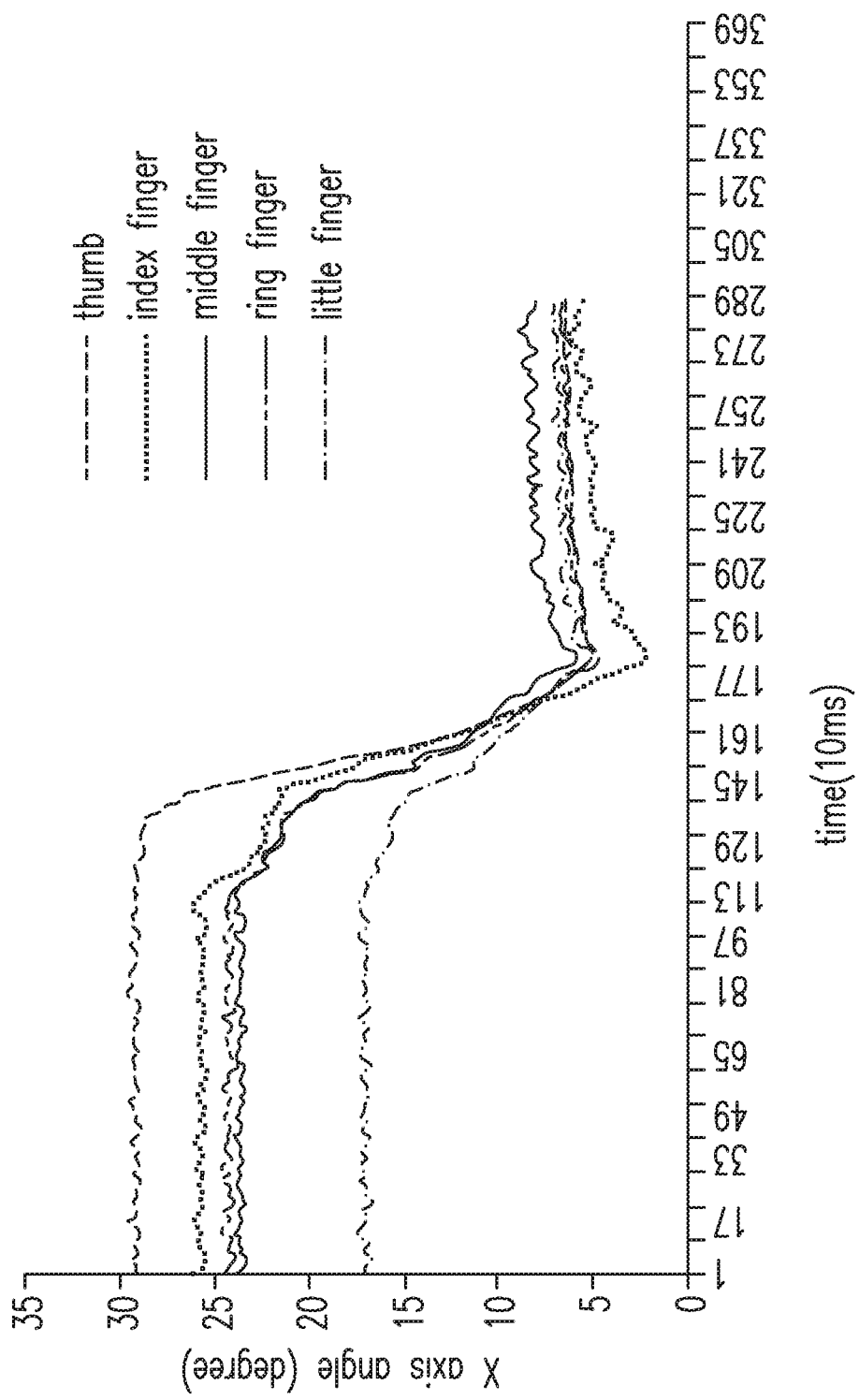
FIG. 8B shows a schematic diagram of the operation angles related to X-direction of each fingers in releasing a virtual object according to a preferred embodiment of the present invention.

Please refer to FIG. 8A, which shows a schematic diagram of applying the movement of fingers and thumb to capture a virtual object VOB2 according to a preferred embodiment of the present invention, and FIG. 8B shows a schematic diagram of applying the movement of fingers and thumb to release a virtual object VOB2 according to a preferred embodiment of the present invention. In FIGS. 8A and 8B, the horizontal axis represents a time unit of 10 milliseconds (ins), and the vertical axis represents the rotation angle of the virtual limbs V1011f, V1012f, V1013f, V1014f and V1015f of the virtual hand model VM1 in the x-axis direction. The initial state of the hand is in an open state, and then all the virtual fingers V1011f, V1012f, V1013f, V1014f and V1015f are continue to bend until the virtual object VOB2 is touched as shown in FIG. 8A. FIG. 8A shows that the limbs 1011f, 1012f, 1013f, 1014f and 1015f wearing the wearable device 101 starting at about 169 milliseconds and continuing to bend until at about 217 milliseconds, the virtual limbs V1011f, V1012f, V1013f, V1014f and V1015f reach a rotation angle of about 25 degrees in the x-axis direction.

In contrast, when all the virtual fingers are initially in a curved state, and then all the virtual fingers V1011f, V1012f, V1013f, V1014f and V1015f are continue to straighten until the virtual object VOB2 is released by the virtual fingers. As shown in FIG. 8B, the limbs 1011f, 1012f, 1013f, 1014f and 1015f wearing the wearable device 101 starting at about 1 milliseconds and continuing to straighten until at about 177 milliseconds, the virtual limbs V1011f, V1012f, V1013f, V1014f and V1015f return to the initial angle of about 5 degrees in the x-axis direction.

Figure 9A:
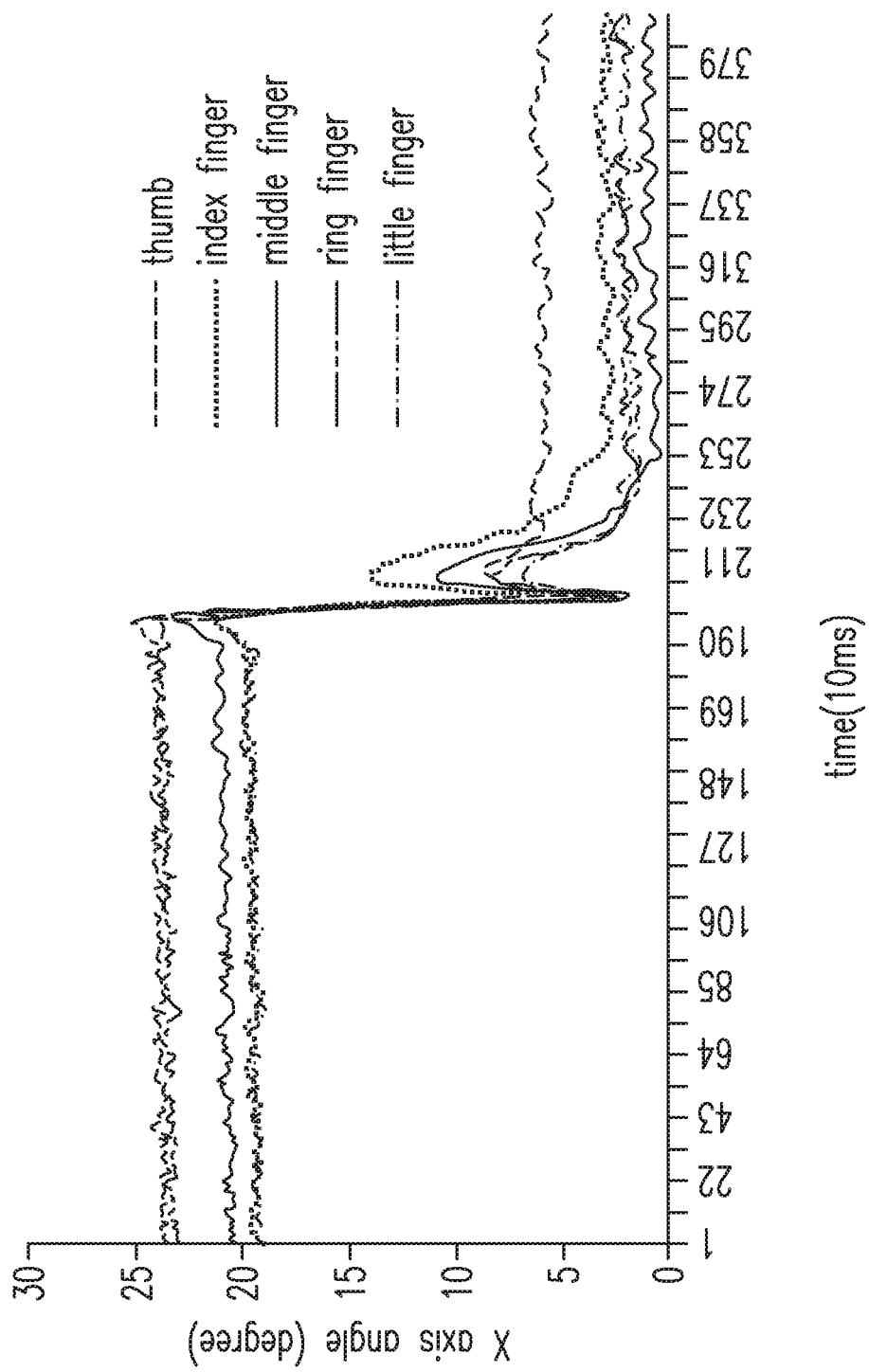
FIG. 9A shows a schematic diagram of the reaction time of the virtual hand model when the virtual object is thrown according to a preferred embodiment of the present invention.
Figure 9B:
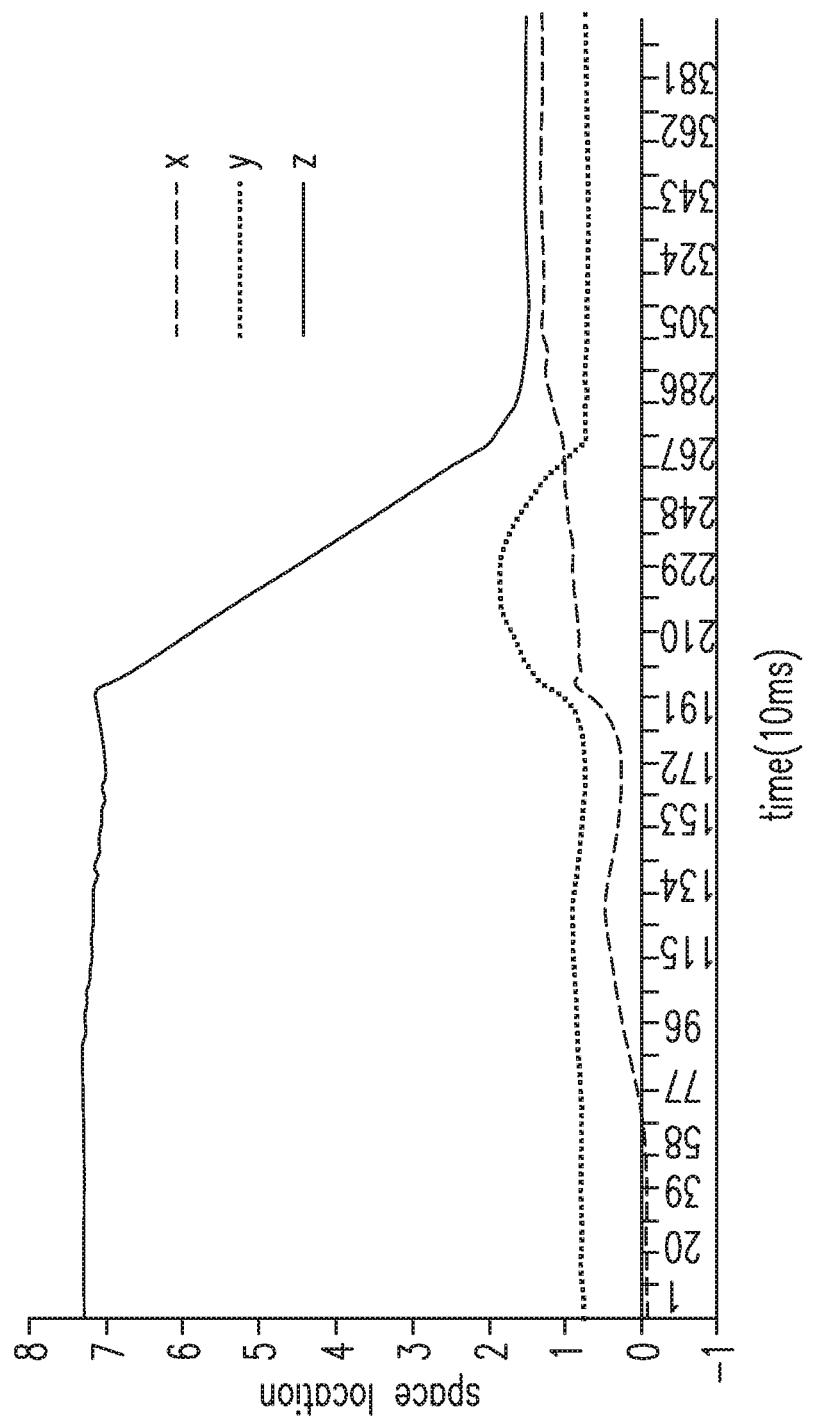
FIG. 9B shows a schematic diagram of the space location of the virtual object when the virtual object is thrown.

Please refer to FIG. 9A, which shows a schematic diagram of the reaction time of the virtual limbs V1011f, V1012f, V1013f, V1014f and V1015f of the virtual hand model VM1 when the virtual object VOB2 is thrown by the VM1 according to a preferred embodiment of the present invention. Please refer to FIG. 9B, which shows a schematic diagram of the change of the space location of the virtual object VOB2 described by a coordinates in the virtual reality VENV1 when the virtual object VOB2 is thrown, and the vertical axis represents the location change of the virtual object VOB2 in the virtual space. The action of grasp as shown in FIG. 8A, all the virtual fingers V1011f, V1012f, V1013f, V1014f and V1015f are initially in a bent state and grasp the virtual object VOB2, the user makes a throw action when starting, and the data is as shown in FIG. 9A and 9B. Because the data of the space location described by the coordinate is a function of time in FIG. 9, it can be seen that the space location of the virtual object VOB2 changes greatly after the user makes the throw motion.

Figure 10A:
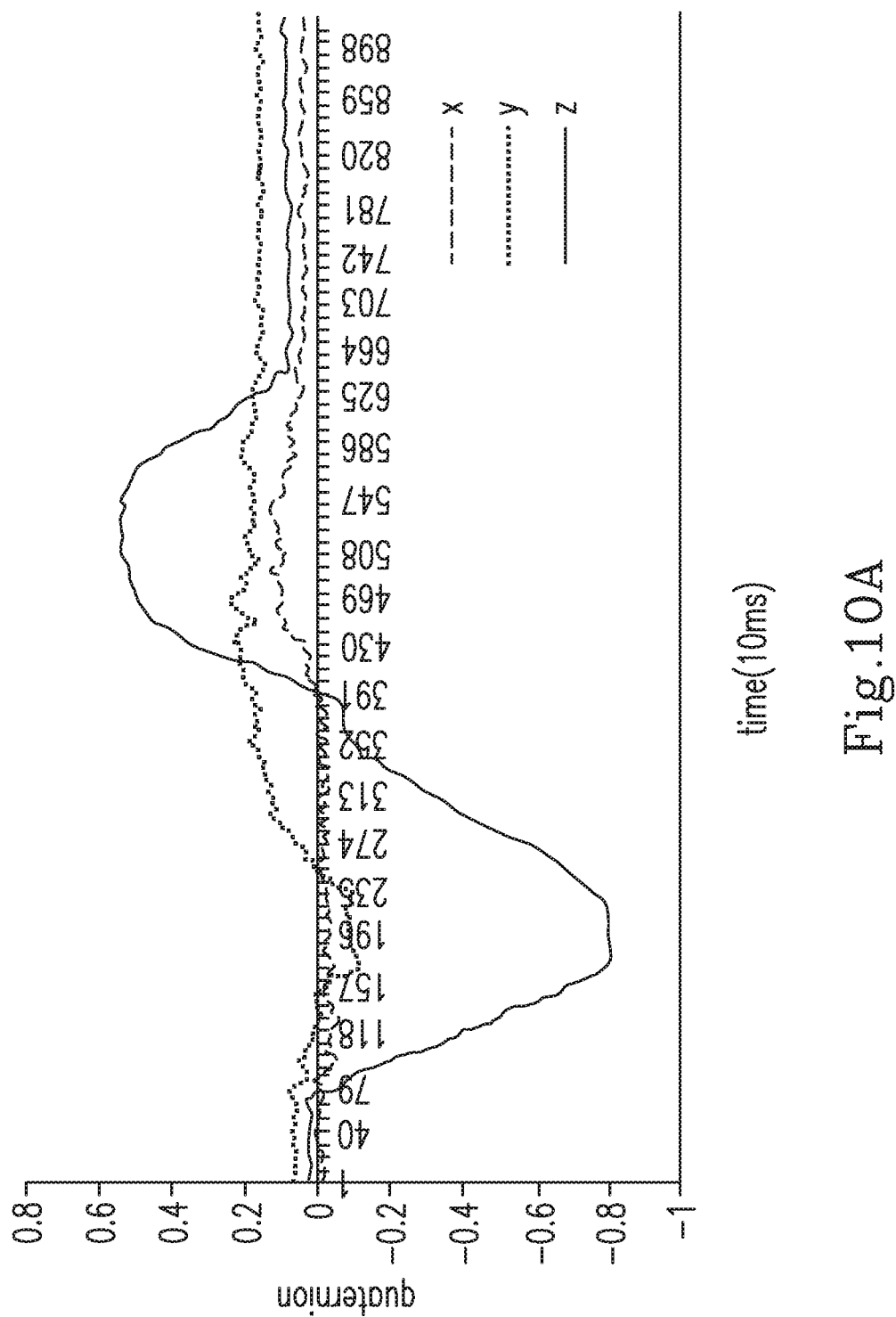
FIG. 10A is a schematic diagram showing the quaternion related to the rotation of the virtual wrist of the virtual hand model according to the preferred embodiment of the present invention.
Figure 10B:
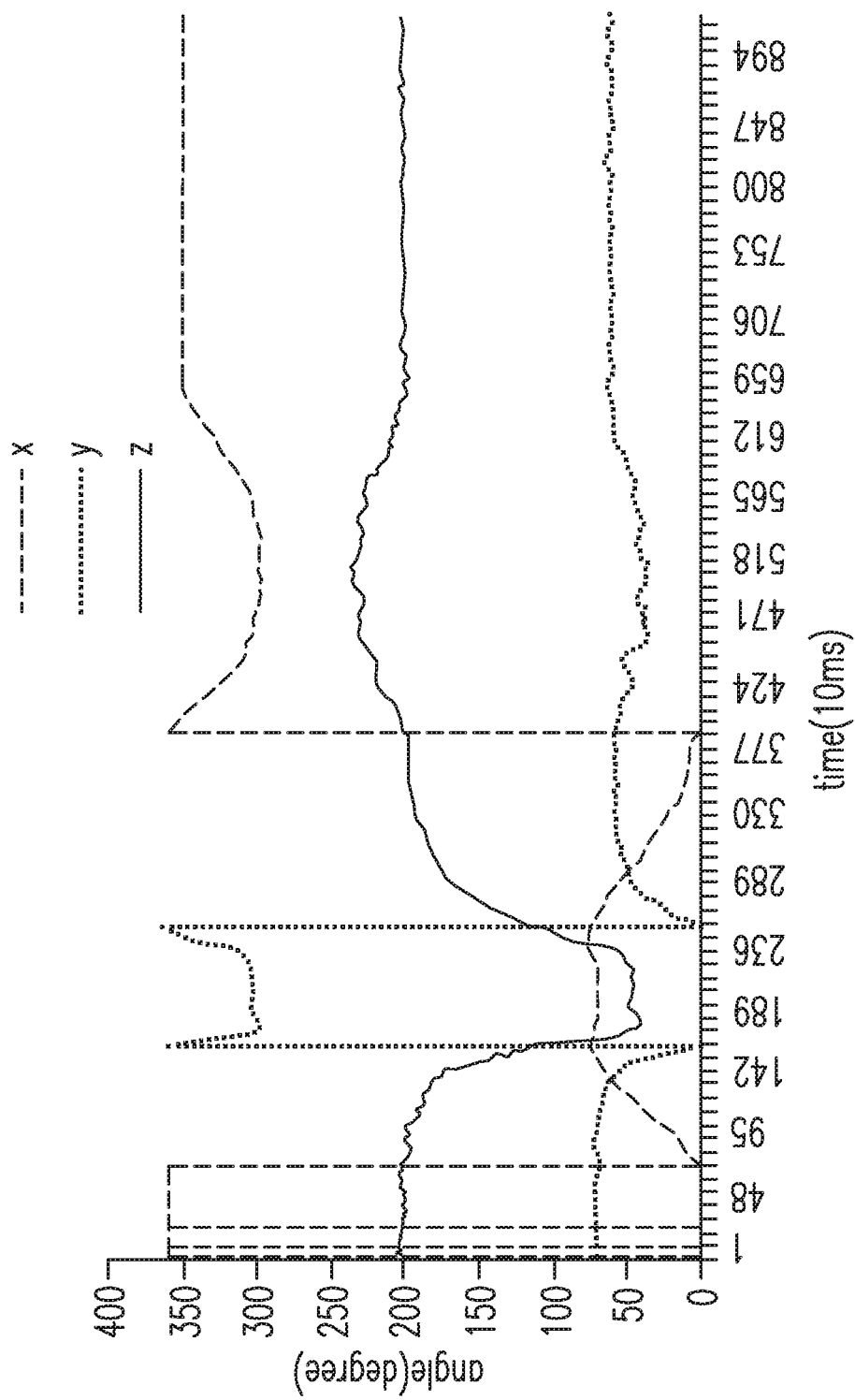
FIG. 10B is a schematic diagram showing the change of the angle of the virtual object held by the virtual wrist in rotation according to the preferred embodiment of the present invention.

Please refer to FIG. 10A, which is a schematic diagram showing the rotation in term of a quatemion representation of the virtual wrist V108w of the virtual hand model VM1 according to the preferred embodiment of the present invention. Please refer to FIG. 10B, which is a schematic diagram showing the change of the angle of the virtual object VOB2 as the virtual wrist V108w rotates in the virtual reality VENV1 according to the preferred embodiment of the present invention. The action as shown in FIG. 8A, all the virtual fingers V1011f, V1012f, V1013f, V1014f and V1015f are initially in a bent state and grasp the virtual object VOB2, the user keeps the real fingers 1011f, 1012f, 1013f, 1014f and 1015f bent, and the wrist 1018w is rotated after starting the action. The data shown in FIG. 10A is about the motion of the virtual hand model VM1, the vertical axis represents the change of the quatemions related to x, y, and z directions of the virtual wrist V108w, and the horizontal axis represents the time unit of a 10-millisecond. FIG. 10B shows the motion of the virtual object VOB2, the vertical axis represents the angular change of the virtual object VOB2, and the horizontal axis represents the time unit of a 10-milliseconds. From FIGS. 10A & 10B, it can be seen that when the user continuously rotates the wrist 108w, the angle of the virtual object VOB2 continuously changes, and when the rotation of the wrist 108w is stopped, the angular change of the virtual object VOB2 is also stopped.

Please refer to the following Table 1, which is a schematic representation of the derived data DRV_DA1 corresponding to the sensing data SDA1 after performing the algorithm AG1.

TABLE 1

| Array | Description |
|---|---|
| 0~3 | quaternion w, x, y, z of wrist |
| 4~6 | Euler angle x, y, z of 1st knuckle of thumb |
| 7~9 | Euler angle x, y, z of 2nd knuckle of thumb |
| 10~12 | Euler angle x, y, z of 3rd knuckle of thumb |
| 13~15 | Euler angle x, y, z of 1st knuckle of index finger |
| 16~18 | Euler angle x, y, z of 2nd knuckle of index finger |
| 19~21 | Euler angle x, y, z of 3rd knuckle of index finger |
| 22~24 | Euler angle x, y, z of 1st knuckle of middle finger |
| 25~27 | Euler angle x, y, z of 2nd knuckle of middle finger |
| 28~30 | Euler angle x, y, z of 3rd knuckle of middle finger |
| 31~33 | Euler angle x, y, z of 1st knuckle of ring finger |
| 34~36 | Euler angle x, y, z of 2nd knuckle of ring finger |
| 37~39 | Euler angle x, y, z of 3rd knuckle of ring finger |
| 40~42 | Euler angle x, y, z of 1st knuckle of little finger |
| 43~45 | Euler angle x, y, z of 2nd knuckle of little finger |
| 46~48 | Euler angle x, y, z of 3rd knuckle of little finger |

According to the algorithm AG1, a dynamic link function library GloveCore.dll is created. The function library provides three functions: Init( ), Run(int16_t) and GetResult( ). The condition determination unit 105 uses GloveCore.dll in a Plugin manner. The function Init is used to initialize the algorithm parameters, the function Run is used to execute the algorithm AG1, and the function GetResult is used to obtain the result of the execution of the algorithm AG1. The incoming parameter is an array of data type int16 (16 bits integer), its length is 54, and the incoming content is raw data of 6 sensors, of which positions or locations are hand back, thumb, index finger, middle finger, ring finger and little finger. The returned data format is a double array with a length of 49, and the contents of the array are shown in Table 1.

The condition determination unit 105 connects the wearable device 101 through the serial port, and reads sensor raw data (170 bytes in total, as shown in Table 2 below), internally performs the sensor raw data through the Run function of GloveCore.dll to execute the algorithm AG1, calls GetResult function to obtain the calculated result, and then applying the result to the virtual hand model VM1 established by the condition determination unit 105 to achieve various functional effects.

TABLE 2

| Byte | Description |
|---|---|
| 0 | Header = 0xff |
| 1 | Data Length |
| 2~5 | Timestamp |
| 6 | I2cBusID |
| 7 | Position |
| 8 | Type |
| 9~14 | 9~10: Acc.x 11~12: Acc.y 13~14: Acc.z |
| 15~20 | 15~16: Gyro.x 17~18: Gyro.y 19~20: Gyro.z |
| 21~26 | 21~22: Magn.x 23~24: Magn.y 25~26: Magn.z |
| 27 | Position |
| 28 | Type |

TABLE 2-continued

| Byte | Description |
|---|---|
| 29~34 | 29~30: Acc.x 31~32: Acc.y 33~34: Acc.z |
| 35~40 | 35~36: Gyro.x 37~38: Gyro.y 39~40: Gyro.z |
| 41~46 | 41-42: Magn.x 43~44: Magn.y 45~46: Magn.z |
| 47 | I2cBusID |
| 48 | Position |
| 49 | Type |
| 50~55 | 50~51: Acc.x 52~53: Acc.y 54~55: Acc.z |
| 56~61 | 56~57: Gyro.x 58~59: Gyro.y 60~61: Gyro.z |
| 62~67 | 62~63: Magn.x 64~65: Magn.y 66~67: Magn.z |
| 68 | Position |
| 69 | Type |
| 70~75 | 70~71: Acc.x 72~73: Acc.y 74~75: Acc.z |
| 76~81 | 76~77: Gyro.x 78~79: Gyro.y 80~81: Gyro.z |
| 82~87 | 82~83: Magn.x 84~85: Magn.y 86~87: Magn.z |
| 88 | I2cBusID |
| 89 | Position |
| 90 | Type |
| 91~96 | 91~92: Acc.x 93~94: Acc.y 95~96: Acc.z |
| 97~102 | 97~98: Gyro.x 99~100: Gyro.y 101~102: Gyro.z |
| 103~108 | 103~104: Magn.x 105~106: Magn.y 107~108: Magn.z |
| 109 | Position |
| 110 | Type |
| 111~116 | 111~112: Acc.x 113~114: Acc.y 115~116: Acc.z |
| 117~122 | 117~118: Gyro.x 119~120: Gyro.y 121~122: Gyro.z |
| 123~128 | 123~124: Magn.x 125~126: Magn.y 127~128: Magn.z |
| 129 | I2cBusID |
| 130 | Position |
| 131 | Type |
| 132~137 | 132~133: Acc.x 134~135: Acc.y 136~137: Acc.z |
| 138~143 | 138~139: Gyro.x 140~141: Gyro.y 142~143: Gyro.z |
| 144~149 | 144~145: Magn.x 146~147: Magn.y 148~149: Magn.z |
| 150 | Position |
| 151 | Type |
| 152~157 | 152~153: Acc.x 154~155: Acc.y 156~157: Acc.z |
| 158~163 | 158~159: Gyro.x 160~161: Gyro.y 162~163: Gyro.z |
| 164~169 | 164~165: Magn.x 166~167: Magn.y 168~169: Magn.z |

The present invention can be applicable to AR or VR games, such as pitching, shooting darts and bowling, etc., and the fine motion (of each finger) of the hand can affect the gaining For example, when throwing balls or shooting darts, the throwing/shooting angle and direction can be altered. Alternatively, the wrist rotation on throwing a bowling ball can cause it so called UFO-balls in spin, or curved balls and so on. Alternatively, the present invention can apply to the large games, such as shooting games, room escapes, etc., and can simulate the action of triggering a real gun shooting, the interaction with the game scene during the puzzle solving, that is to perform the hand motion in virtual reality to make the user to experience a more realistic operation. It can enhance the user's perception of being more immersed and closer to real life when experiencing VR or AR applications.

Figure 11:
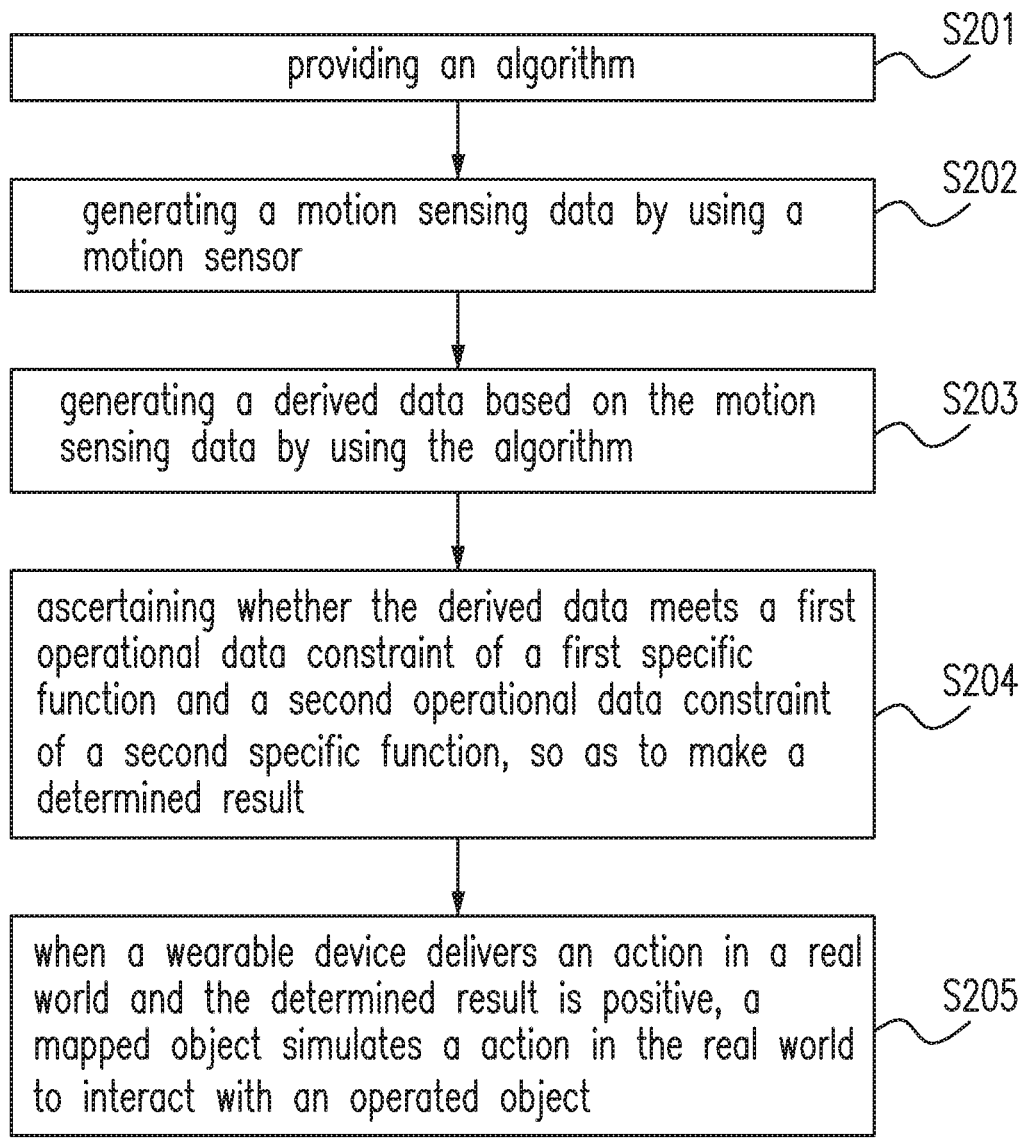
FIG. 11 shows a schematic diagram of an operating method for a wearable device interacting with an operated object in a virtual reality according to a preferred embodiment of the present invention.

Please refer to FIG. 11, which shows a schematic diagram of an operating method S20 for a wearable device interacting with an operated object in a virtual reality according to a preferred embodiment of the present invention. Wherein the wearable device has a motion sensor, corresponds to a mapped object in the virtual reality, and is coupled to a first specific unit for executing a first specific function and a second specific unit for executing a second specific function, the method comprises steps of: Step S201, providing an algorithm; Step S202, generating a motion sensing data by using the motion sensor; Step S203, generating a derived data based on the motion sensing data by using the algorithm; Step S204, ascertaining whether the derived data meets a first operational data constraint of the first specific function and a second operational data constraint of the second specific function, so as to make a determined result; and Step S205, when the wearable device delivers an action in a real world and the determined result is positive, the mapped object simulates the action in the real world to interact with the operated object.

Figure 12:
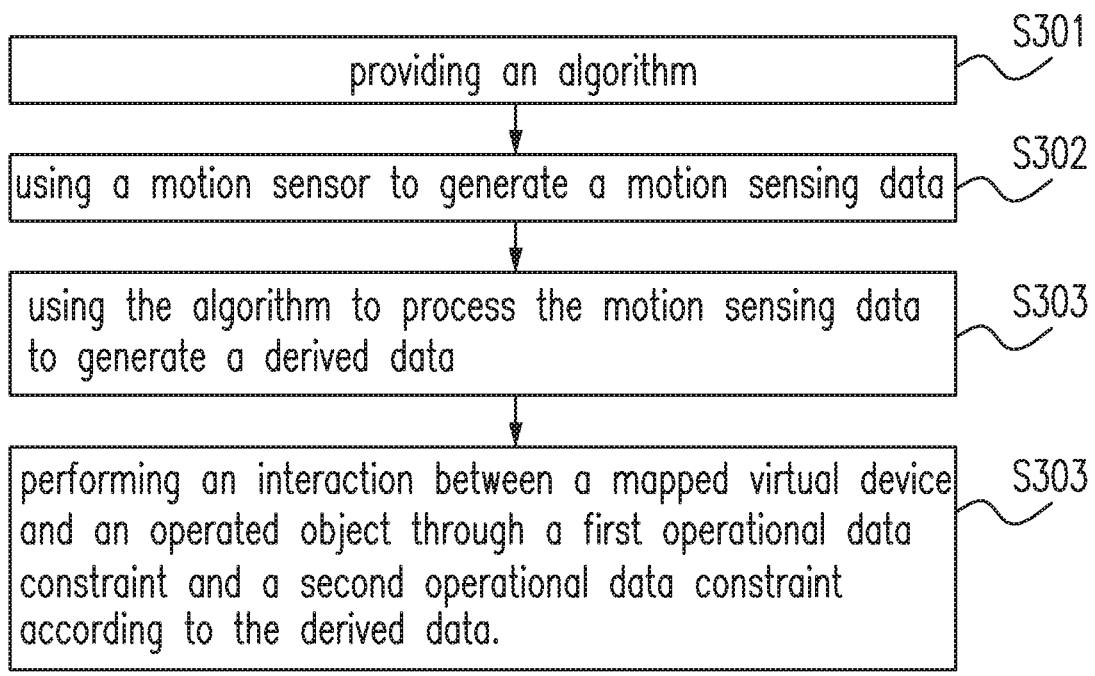
FIG. 12 shows a schematic diagram of an operating method for a wearable device interacting with a virtual reality according to another preferred embodiment of the present invention.

Please refer to FIG. 12, which shows a schematic diagram of an operating method S30 for a wearable device interacting with a virtual reality according to another preferred embodiment of the present invention. Wherein the wearable device has a motion sensor and a mapped virtual device, the virtual environment has an operated object, the mapped virtual device has a first operational data constraint, and the operated object has a second operational data constraint. The operating method S30 includes the following steps: Step S301, providing an algorithm; Step S302, using a motion sensor to generate a motion sensing data; Step S303, using the algorithm to process the motion sensing data to generate a derived data; and Step S304, performing an interaction between the mapped virtual device and the operated object through a first operational data constraint and a second operational data constraint according to the derived data.

In FIG. 12, the derived data is a function of time, and can be used to drive the operated object. The interaction relationship includes: performing a first determining operation to determine whether the mapped virtual device has completed a capturing of the operated object; performing a second determining operation to determine whether the mapped virtual device has completed a releasing of the operated object; and causing the operated object to inherit the motion state described by the derived data when the second determining operation is performed, so that the operated object has a motion state corresponding to the derived data. The word "inherit" can refer to pass derived data (parameters) between two virtual (software) objects, and the operated object keeps properties that the mapped virtual device has at the moment when the operated object is being released. For example, the properties have parameters including at least one of an acceleration data, an angular velocity data, and a position data of the motion sensor. However, before the operated object is released, the motion state of the operated objects is related to those parameters. The step of performing the first determining operation includes determining whether the derived data related to a virtual touch position of the wearable device meets a spatial position data constraint indicating a specific range occupied by the operated object in the virtual reality; and the step of determining whether a first touch data constraint inclusive of a thumb touch and at least one finger touch is met to complete a first determining operation. In addition, the step of performing the second determining operation includes: determining whether the derived data related to a virtual touch position of the wearable device meets a spatial position data constraint indicating a specific range occupied by the operated object in the vertical reality; and the step of determining whether a second touch data constraint with no finger touch or only one finger touch is met to complete a second determining operation, wherein the derived data includes at least one of an acceleration data, an angular velocity data, and a position data of the motion sensor.

Figure 13:
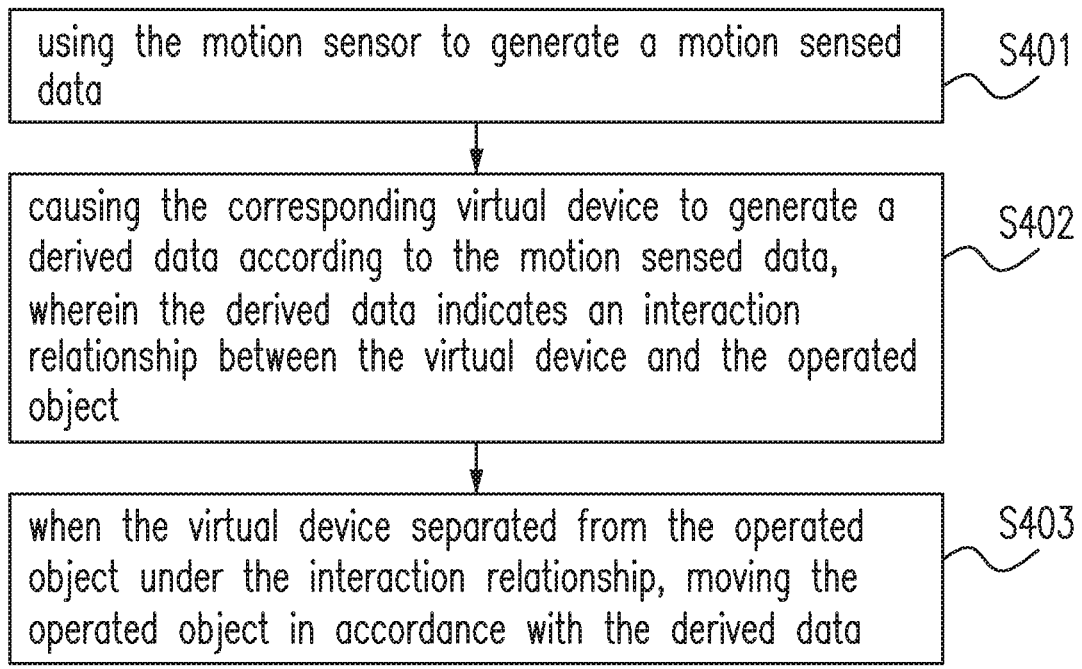
FIG. 13 shows a schematic diagram of an operating method for a wearable device interacting with a virtual reality according to another preferred embodiment of the present invention.

Please refer to FIG. 13, which shows a schematic diagram of an operating method S40 for a wearable device interacting with a virtual reality according to another preferred embodiment of the present invention. The wearable device has a motion sensor, the virtual environment has an operated object and a virtual device corresponding to the wearable device, the corresponding virtual device has a first operational data constraint, and the operated object has a second operational data constraint, the operating method comprises the following steps of: Step S401, using the motion sensor to generate a motion sensed data; Step S402, causing the corresponding virtual device to generate a derived data according to the motion sensed data, wherein the derived data indicates an interaction relationship between the virtual device and the operated object; and Step S403, when the virtual device separated from the operated object under the interaction relationship, moving the operated object in accordance with the derived data.

Embodiments

1. An operating method for a wearable device interacting with an operated object in a virtual reality, wherein the wearable device has a motion sensor, corresponds to a mapped object in the virtual reality, and is coupled to a first specific unit for executing a first specific function and a second specific unit for executing a second specific function, the method comprises steps of: providing an algorithm; generating a motion sensing data by using the motion sensor; generating a derived data based on the motion sensing data by using the algorithm; ascertaining whether the derived data meets a first operational data constraint of the first specific function and a second operational data constraint of the second specific function so as to make a determined result; and when the wearable device delivers an action in a real world and the determined result is positive, the mapped object simulates the action in the real world to interact with the operated object.

2. The operating method in Embodiment 1, wherein the wearable device is a smart glove; the motion sensor includes at least one of an acceleration meter, a gyroscope, and a geomagnetic instrument; and the derived data includes at least one of a quaternion data and a Euler angular data.

3. The operating method of any one of Embodiments 1-2, wherein the first specific unit includes an event trigger detecting unit determining whether the mapped object touches the operated object; and the first operational data constraint includes a touch data restriction condition indicating a touch condition inclusive of a thumb touch and at least one finger touch.

4. The operating method of any one of Embodiments 1-3, wherein the second specific unit includes a virtual reality generating unit; and the second operational data constraint includes a spatial location data constraint condition indicating a spatial location constraint condition, and the spatial location constraint condition is a specific range occupied by the operated object in a virtual space of a virtual reality.

5. The operating method of any one of Embodiments 1-4, wherein the action is the movement of a hand; the mapped object is a first virtual object, wherein under a condition that the first virtual object is a virtual hand model, the virtual hand model includes at least one of a virtual palm, a virtual wrist, a virtual thumb, a virtual index finger, a virtual middle finger, a virtual ring finger and a virtual little finger; and the operated object is a second virtual object being different from the first virtual object.

6. The operating method of any one of Embodiments 1-5, further comprising the following steps of: performing a first determining operation to determine whether the wearable device has completed a grasp of the operated object; performing a second determining operation to determine whether the wearable device has completed a release of the operated object; and on a condition that the second determining operation is performed, causing the operated object to inherit the derived data when the second determining operation is performed so that the operated object has a motion state corresponding to the derived data.

7. The operating method of any one of Embodiments 1-6, wherein the derived data further includes coordinate data; and the operating method further comprises the following steps of: determining whether the derived data related to a virtual touch position of the wearable device meets a spatial position data constraint indicating a specific range occupied by the operated object in a virtual space, and determining whether a first touch data constraint inclusive of a thumb touch and at least one finger touch is met to complete a first determining operation.

8. The operating method of any one of Embodiments 1-7, further comprising the following steps of: determining whether the derived data related to a virtual touch position of the wearable device meets a spatial position data constraint indicating a specific range occupied by the operated object in a virtual space; and determining whether a second touch data constraint with no finger touch or only one finger touch is met to complete a second determining operation, wherein the derived data includes at least one of an acceleration data, an angular velocity data, and a position data of the motion sensor.

9. An operating device for operating a virtual object comprises a wearable device and a processing module. The wearable device is worn on a limb, and has a motion sensor sensing a motion of the limb to generate a sensed data associated with the motion. The processing module is coupled to the wearable device, and operates the sensing data to generate a derived data, wherein: the processing module generates a virtual environment, and determines whether the derived data satisfies a first operational data constraint and a second operational data constraint; and the virtual environment is configured to construct a mapped object and a virtual object, wherein the mapped object virtually simulates the motion according to the derived data, the virtual object interacts with the mapped object when the first and the second operational data constraints are satisfied.

10. The operating device in Embodiment 9, wherein the wearable device includes a smart glove; the limb includes at least one of a palm and a plurality of fingers; the motion sensor includes at least one of an acceleration meter, a gyroscope and a geomagnetic instrument; and the derived data includes at least one of a quaternion data and a Euler angular data.

11. The operating device of any one in Embodiments 9-10, wherein the processing module is a condition determination unit including at least one of a touch detection unit, a virtual environment generation unit and an associated operation software thereof; the first operational data constraint is a touch data constraint condition set by the touch detection unit; and the second operational data constraint is a spatial location data constraint condition set by the virtual environment generation unit and the operation software thereof.

12. The operating device of any one in Embodiments 9-11, wherein the mapped object is a first virtual object or a virtual hand model, and includes at least one of a virtual palm, a virtual wrist, a virtual thumb, a virtual index finger, a virtual middle finger, a virtual ring finger, and a virtual little finger; and the virtual object is a second virtual object to interact with the mapped object.

13. The operating device of any one in Embodiments 9-12, wherein the processing module is a condition determination unit including at least one of a touch detection unit, a virtual environment generation unit and a related operation software thereof; the touch detection unit performs a first determining operation to determine whether the wearable device has completed a capture of the virtual object; the touch detection unit performs a second determining operation to determine whether the wearable device has completed a release of the virtual object; and on the condition that the second determining operation is performed, the operation software causes the virtual object to inherit the derived data when the second determining operation is performed so that the virtual object has a motion state corresponding to the derived data.

14. The operating device of any one in Embodiments 9-13, wherein the derived data further includes coordinate data; the processing module includes a condition determination unit; the condition determination unit determines whether the derived data related to a virtual touch position of the wearable device meets a spatial position data constraint indicating a specific range occupied by the operated object in a virtual space; the condition determination unit determines whether a first touch data constraint inclusive of a thumb touch and at least one finger touch is met to complete a first determining operation; the condition determination unit determines whether the derived data related to a virtual touch position of the wearable device meets a spatial position data constraint indicating a specific range occupied by the operated object in a virtual space; and the condition determination unit determines whether a second touch data constraint with no finger touch or only one finger touch is met to complete a second determining operation, wherein the derived data includes at least one of an acceleration data, an angular velocity data and a position data of the motion sensor.

15. An operating method in a virtual environment through a wearable device, wherein the wearable device has a motion sensor, the virtual environment has an operated object and a virtual device corresponding to the wearable device, the corresponding virtual device has a first operational data constraint, and the operated object has a second operational data constraint, the operating method comprising the following steps of: using the motion sensor to generate a motion sensed data; causing the corresponding virtual device to generate a derived data according to the motion sensed data, wherein the derived data indicates an interaction relationship between the virtual device and the operated object; and when the virtual device separated from the operated object under the interaction relationship, moving the operated object in accordance with the derived data.

16. The operating method in Embodiment 15, further comprising steps of: performing a first determining operation including: determining whether the derived data related to a virtual touch position of the virtual device meets a spatial position data constraint indicating a specific range occupied by the operated object in a virtual space, and determining whether a first touch data constraint inclusive of a thumb touch and at least one finger touch is met to complete the first determining operation.

17. The operating method of any one of Embodiments 15-16, further comprising steps of: performing a second determining operation including: determining whether the derived data related to a virtual touch position of the corresponding virtual device meets a spatial position data constraint indicating a specific range occupied by the operated object in a virtual space; and determining whether a second touch data constraint with no finger touch or only one finger touch is met to complete the second determining operation, wherein the derived data includes at least one of an acceleration data, an angular velocity data and a position data of the motion sensor.

18. The operating method of any one of Embodiments 15-17, wherein the interaction relationship includes: performing a first determining operation to determine whether the wearable device has completed a grasp of the operated object; performing a second determining operation to determine whether the virtual device has completed a release of the operated object; and on a condition that the second determining operation is performed, causing the operated object to inherit the derived data when the second determining operation is performed so that the operated object has a motion state corresponding to the derived data.

19. The operating method of any one of Embodiments 15-18, wherein the derived data is a function of time, and the function of time is a time-dependent quaternion or an Euler angle; and the derived data drives the operated object.

20. The operating method of any one of Embodiments 15-19, wherein the virtual device is a first virtual object, wherein under a condition that the first virtual object is a virtual hand model, the virtual device includes at least one of a virtual palm, a virtual wrist, a virtual thumb, a virtual index finger, a virtual middle finger, a virtual ring finger and a virtual little finger; and the operated object is a second virtual object being different from the first virtual object.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An operating method for a wearable device interacting with an operated object in a virtual reality, wherein the wearable device has a motion sensor, corresponds to a mapped object in the virtual reality, and is coupled to a touch detection unit for executing a first specific function and a virtual environment generation unit for executing a second specific function, the method comprising steps of:
providing an algorithm;
generating a motion sensing data by using the motion sensor, wherein the mapped object is a first virtual object having a virtual hand model including at least one of a virtual palm, a virtual wrist, a virtual thumb, a virtual index finger, a virtual middle finger, a virtual ring finger and a virtual little finger, each of which corresponds to a respective motion sensor for rotating to a specific angle in three degrees of freedom;
generating a derived data based on the motion sensing data by using the algorithm;
ascertaining whether the derived data meets a touch data restriction condition of the first specific function and a spatial location data constraint condition of no finger touch or only one finger touch for the second specific function so as to make a determined result; and
when the wearable device delivers a movement of a hand in a real world and the determined result is positive, the mapped object simulates the movement of the hand in the real world to interact with the operated object by causing the operated object to inherit the derived data, wherein the operated object simulates a fine motion including rotations or spins after the operated object is released according to the respective motion sensor corresponding to rotations of the virtual hand model.

2. The operating method as claimed in claim 1, wherein:
the wearable device is a smart glove;

the motion sensor includes at least one of an acceleration meter, a gyroscope, and a geomagnetic instrument; and the derived data includes at least one of a quaternion data and a Euler angular data.

3. The operating method as claimed in claim 1, wherein:

the touch detection unit includes an event trigger detecting unit determining whether the mapped object touches the operated object; and the first operational data constraint includes a touch data restriction condition indicating a touch condition inclusive of a thumb touch and at least one finger touch.

4. The operating method as claimed in claim 1, wherein:

the virtual environment generation unit includes a virtual reality generating unit; and the spatial location data constraint condition indicates indicating a spatial location constraint condition, and the spatial location constraint condition is a specific range occupied by the operated object in a virtual space.

5. The operating method as claimed in claim 1, wherein:

the operated object is a second virtual object being different from the first virtual object.

6. The operating method as claimed in claim 1, further comprising the following steps of:

performing a first determining operation to determine whether the wearable device has completed a grasp of the operated object;

performing a second determining operation to determine whether the wearable device has completed a release of the operated object; and on a condition that the second determining operation is performed, causing the operated object to inherit the derived data when the second determining operation is performed so that the operated object has a motion state corresponding to the derived data.

7. The operating method as claimed in claim 1, wherein:

the derived data further includes coordinate data; and the operating method further comprises the following steps of:

determining whether the derived data related to a virtual touch position of the wearable device meets a spatial position data constraint indicating a specific range in the virtual reality for the operated object to move therein-, and determining whether a first touch data constraint inclusive of a thumb touch and at least one finger touch is met to complete a first determining operation.

8. The operating method as claimed in claim 1, further comprising the following steps of:

determining whether the derived data related to a virtual touch position of the wearable device meets a spatial position data constraint indicating a specific range in the virtual reality for the operated object to move therein; and determining whether a second touch data constraint is met to complete a second determining operation, wherein the derived data includes at least one of an acceleration data, an angular acceleration data, and a position data of the motion sensor.

9. An operating device for operating a virtual object, comprising:

a wearable device worn on a limb, and having a motion sensor sensing a motion of the limb to generate a sensed data associated with the motion;

a processing module including at least one of a touch detection unit, a virtual environment generation unit and an associated operation software thereof, coupled to the wearable device, and operating an algorithm to process the sensing data to generate a derived data, wherein:

the virtual environment generation unit generates a virtual environment, and determines whether the derived data satisfies a touch data constraint condition set by the touch detection unit and a spatial location data constraint condition set by the virtual environment generation unit and the associated operation software thereof; and the virtual environment is configured to construct a mapped object and a virtual object, wherein the mapped object is a virtual hand model including at least one of a virtual palm, a virtual wrist, a virtual thumb, a virtual index finger, a virtual middle finger, a virtual ring finger and a virtual little finger, each of which corresponds to a respective motion sensor for rotating to a specific angle in three degree of freedom, the mapped object virtually simulates the motion according to the derived data, the virtual object interacts with the mapped object when the touch data constraint condition and the spatial location data constraint condition are satisfied, and when the wearable device has completed a release of no finger touch or only one finger touch, the virtual object inherits the derived data, wherein the virtual object simulates a fine motion including rotations or spins after the virtual object is released according to the respective motion sensor corresponding to rotations of the virtual hand model.

10. The operating device as claimed in claim 9, wherein:

the wearable device includes a smart glove;

the limb includes at least one of a palm and a plurality of fingers;

the motion sensor includes at least one of an acceleration meter, a gyroscope and a geomagnetic instrument; and the derived data includes at least one of a quaternion data and a Euler angular data.

11. The operating device as claimed in claim 9, wherein the touch detection unit performs a first determining operation to determine whether the wearable device has completed a capture of the virtual object;

the touch detection unit performs a second determining operation to determine whether the wearable device has completed a release of the virtual object; and on the condition that the second determining operation is performed, the operation software causes the virtual object to inherit the derived data when the second determining operation is performed so that the virtual object has a motion state corresponding to the derived data.

12. The operating device as claimed in claim 9, wherein the derived data further includes coordinate data;

the processing module includes a condition determination unit;

the condition determination unit determines whether the derived data related to a virtual touch position of the wearable device meets a spatial position data constraint indicating a specific range for moving the operated object in a space;

the condition determination unit determines whether a first touch data constraint inclusive of a thumb touch and at least one finger touch is met to complete a first determining operation; and the condition determination unit determines whether a second touch data constraint with no finger touch or only one finger touch is met to complete a second determining operation, wherein the derived data includes at least one of an acceleration data, an angular velocity data and a position data of the motion sensor.

13. An operating method in a virtual environment through a wearable device, wherein the wearable device has a motion sensor, the virtual environment has an operated object and a virtual device corresponding to the wearable device, the corresponding virtual device has a touch data restriction condition, and the operated object has a spatial location data constraint condition, the operating method comprising the following steps of:
   providing an algorithm;
   using the motion sensor to generate a motion sensed data, wherein the virtual device is a first virtual object having the virtual hand model including at least one of a virtual palm, a virtual wrist, a virtual thumb, a virtual index finger, a virtual middle finger, a virtual ring finger and a virtual little finger, each of which corresponds to a respective motion sensor for rotating to a specific angle in three degrees of freedom;
   causing the corresponding virtual device to generate a derived data according to the motion sensed data, wherein the derived data indicates an interaction relationship between the virtual device and the operated object; and
   when the virtual handle model separated from the operated object under the interaction relationship without finger touch or only one finger touch therebetween, the operated object inherits the derived data and moves in accordance with the derived data, wherein the operated object simulates a fine motion including rotations or spins after the operated object is released according to the respective motion sensor corresponding to rotations of the virtual hand model.

14. The operating method as claimed in claim 13, further comprising steps of:
   performing a first determining operation including:
   determining whether the derived data related to a virtual touch position of the virtual device meets a spatial position data constraint indicating a specific range for moving the operated object in a virtual space, and
   determining whether a first touch data constraint inclusive of a thumb touch and at least one finger touch is met to complete the first determining operation.

15. The operating method as claimed in claim 13, further comprising steps of:
   performing a second determining operation including:
   determining whether the derived data related to a virtual touch position of the corresponding virtual device meets a spatial position data constraint indicating a specific range for moving the operated object in a virtual space; and
   determining whether a second touch data constraint with no finger touch or only one finger touch is met to complete the second determining operation, wherein the derived data includes at least one of an acceleration data, an angular velocity data and a position data of the motion sensor.

16. The operating method as claimed in claim 13, wherein:
   the interaction relationship includes:
   performing a first determining operation to determine whether the wearable device has completed a grasp of the operated object;
   performing a second determining operation to determine whether the virtual device has completed a release of the operated object; and
   on a condition that the second determining operation is performed, causing the operated object to inherit the derived data when the second determining operation is performed so that the operated object has a motion state corresponding to the derived data.

17. The operating method as claimed in claim 13, wherein:
   the derived data is a function of time, and the function of time is a time-dependent quaternion or a Euler angle; and
   the derived data drives the operated object.

18. The operating method as claimed in claim 13, wherein:
   the operated object is a second virtual object being different from the first virtual object.

* * * * *